United States Patent
Wang et al.

(10) Patent No.: US 9,553,317 B2
(45) Date of Patent: Jan. 24, 2017

(54) CERAMIC CATHODE MATERIAL OF SOLID OXIDE FUEL CELL AND MANUFACTURING METHOD THEREOF

(71) Applicant: National Taipei University of Technology, Taipei (TW)

(72) Inventors: Sea-Fue Wang, Taipei (TW); Yung-Fu Hsu, Taipei (TW); Yi-Xin Liu, Taipei (TW)

(73) Assignee: National Taipei University of Technology, Taipei (TW)

( * ) Notice: Subject to any disclaimer, the term of this patent is extended or adjusted under 35 U.S.C. 154(b) by 40 days.

(21) Appl. No.: 14/446,023

(22) Filed: Jul. 29, 2014

(65) Prior Publication Data

US 2016/0036063 A1  Feb. 4, 2016

(51) Int. Cl.
*H01M 4/90* (2006.01)
*H01M 4/88* (2006.01)
*H01M 4/86* (2006.01)
*H01M 8/12* (2016.01)

(52) U.S. Cl.
CPC ......... *H01M 4/9033* (2013.01); *H01M 4/8875* (2013.01); *H01M 4/8885* (2013.01); *H01M 2004/8689* (2013.01); *H01M 2008/1293* (2013.01); *Y02E 60/50* (2013.01); *Y02E 60/525* (2013.01)

(58) Field of Classification Search
CPC ............ H01M 2004/8689; H01M 2008/1293; H01M 4/8875; H01M 4/8885; H01M 4/9033
See application file for complete search history.

(56) References Cited

PUBLICATIONS

Nguyen Tien-Thao, Houshang Alamdari, Serge Kaliaguine. Characterization and reactivity of nanoscale La(Co,Cu)O3 perovskite catalyst precursors for CO hydrogenation, Journal of Solid State Chemistry 181 (2008) 2006-2019.*
Qiang Li, Xu Zeng, Liping Sun, Hui Zhao, Lihua Huo, Jean-Claude Grenier. Electrochemical performance of La2Cu1LxCoxO4 cathode materials for intermediate-temperature SOFCs, International Journal of Hydrogen Energy 37 (2012) 2552-2558.*

* cited by examiner

*Primary Examiner* — Carlos Barcena
(74) *Attorney, Agent, or Firm* — WPAT, P.C., Intellectual Property Attorneys; Anthony King

(57) ABSTRACT

A ceramic cathode material of a solid oxide fuel cell and a manufacturing method thereof are disclosed. The method includes mixing a lanthanum-containing compound, a cobalt-containing compound, a nickel-containing compound, and a copper-containing compound, for preparing the ceramic cathode material of the solid oxide fuel cell of intermediate/low type. The ceramic cathode material of the solid oxide fuel cell is $LaCo_zNi_yCu_xO_{3-\delta}$, in which x ranges from 0.01 to 0.3, y ranges from 0 to 0.89, and z ranges from 0.1 to 0.99. The ceramic cathode material manufactured by mixing the lanthanum-containing compound, the cobalt-containing compound, the nickel-containing compound, and the copper-containing compound when operating within the temperature range from 500 to 800 degrees Celsius is of high electrical conductivity and reduced thermal expansion coefficient.

6 Claims, 5 Drawing Sheets

CERAMIC CATHODE MATERIAL OF SOLID OXIDE FUEL CELL AND MANUFACTURING METHOD THEREOF

BACKGROUND

1. Technical Field

The present disclosure relates to a ceramic cathode material of a solid oxide fuel cell and a manufacturing method thereof; in particular, to a ceramic cathode material which is applicable in a fuel cell, and the ceramic cathode material has the features of higher electrical conductivity and reduced thermal expansion coefficient operating within the temperature range from 500 to 800 degrees Celsius.

2. Description of Related Art

There are multiple fuel cells that are categorized in terms of electrolyte and operating temperature range. The fuel cells with the largest development potential are the proton exchange membrane fuel cell (PEMFC) and the solid oxide fuel cell (SOFC).

One of the main objectives of commercializing the SOFC is for lowering the operating temperature of the same. Generally, the operating temperature of the high temperature SOFC ranges from 800 to 1000 degrees Celsius, but the high operating temperature accompanies some defects, such as relatively lower open circuit voltage, more demanding requirement for the cell material, more expensive material cost, and longer waiting time for rising the temperature of the connection board. In addition, because of the high operating temperature requiring the longer waiting time for increasing or decreasing the temperature, tensile stress and compressive stress in the inner structure of the fuel cell may result, increasing the possibility of components of the cell fuel being damaged. The operating temperature of the IT (intermediate)-SOFC ranges from 500 to 800 degrees Celsius. Comparing with the high temperature SOFC, the IT-SOFC has the advantages such as extended lifetime and more connection material selections (without being limited to the use of ceramic material only). However, in the relatively lower operating temperature, the electrical conductivity is lowered and the activating polarity may apparently increase along with the reduced operating temperature. Therefore, the development of the medium/low temperature cathode material with better performances is very important.

The advantages of solid oxide fuel cell are as follows:

(1) High efficiency: The conventional electricity generation processes need to go through a series of energy conversions. Part of the energy may dissipate into the air during each energy conversion, thus the total energy conversion efficiency is relatively low. The efficiency of the conventional thermal power generation is about 30%. The fuel cell directly converts the chemical energy into electricity without coal burning process, thus the energy waste thereof is relatively low. Theoretically, the efficiency of the fuel cell is around 85 to 90% despite only about 40 to 60% in practice.

(2) No noise: Presently, the common electricity generation technique including thermal electricity generation, hydro electricity generation, or nuclear electricity generation mainly uses large turbines generating large amount of noises during the operation. On the other hand, the fuel cell does not need machine parts when performing electrochemical reactions, which is different from the conventional electricity generation. Therefore, the fuel cell could be a virtually noiseless electricity generation system.

(3) Low contamination: In coal, petroleum, nuclear energy for generating electricity, harmful substances such as $SO_x$, $NO_x$, and $CO_x$ may be generated and nuclear waste may be difficult to be disposed of. On the other hand, the fuel cell is relatively environmentally friendly option.

(4) Variety selections of fuel: Some specific fuel cell sets can use the energy other than hydrogen gas. Due to relatively lower density, the hydrogen gas is not convenient to be stored. Thus, the liquid hydrogen energy is used as fuels, such as alcohol or liquid fossil fuels, for providing much more convenience and durability.

Presently, the problems of the cathode material of the most widely used high temperature SOFC are that the electrical conductivity, the thermal expansion coefficient, and the stability thereof remain to be desired and not suitable just yet for large scale commercial development. Therefore, the cathode material needs to have relatively better electrical conductivity, electrolyte matching, and stability when operating in the intermediate temperature range. The matching materials include the perovskite, the cubic fluorite, and the pyrochlore, and the pyrochlore so far has been gaining more popularity.

The following descriptions are the must-have conditions of the medium cathode materials:

(1) Stability: The cathode material needs to have chemical, crystal form, morphology, and size stabilities, under the temperature from the room temperature to the operating temperature. In addition, the electrolyte, the connection material, and other components also need to have good chemical stability.

(2) Electrical conductivity: The cathode needs to have high ionic conductivity and electron conductivity for lowering the ohmic polarization.

(3) Thermal expansion: The thermal expansion coefficient of the material needs to match the thermal expansion of the electrolyte, connection materials, and other components, for avoiding deformation, detachment, and cracks.

(4) Porosity: For allowing the gas to reach and react at the electrode, the cathode material needs to have at least 30% of the porosity.

(5) Catalytic capability: The material needs to have good catalytic capability toward oxygen for allowing the oxygen molecule to perform dissociation reactions.

In early days, the cathode material uses the precious metals including platinum, palladium, and silver, etc., which have good electrical conductivity. However, the precious metals are expensive and the silver is volatile under high temperature. The $Ln_{1-x}A_xMO_{3+\delta}$ (Ln is the lanthanum series element, A is alkaline earth family element, and M is the transition metal element) which has the structure of perovskite could satisfy the requirements of electrical conductivity of the cathode material. Generally, the material is made by adding alkaline earth family element into $LnMO_3$, for increasing the electrical conductivity of the cathode material under the high temperature. By replacing part of the rare earth family element with alkaline earth family, the valence number of the transition metals changes or forms oxygen vacancies under certain conditions, for maintaining the lattice electrical neutrality and for increasing electrical conductivity.

The $LaCoO_{3-\delta}$ is a standard perovskite structure material which is rhombohedral phase structure and forms a distorted octahedral structure ($CoO_6^{9-}$) under the room temperature. In addition, the rhombohedral phase structure may phase transform into cubic structure at the temperature of 509 degrees Celsius. The $LaCoO_{3-\delta}$ cathode material is the mixed conductor which has the features of electron conductivity and ionic conductivity, and is a semi-conductive material. However, although the $LaCoO_{3-\delta}$ and $LaCo_{0.4}Ni_{0.6}O_{3-\delta}$ which are manufactured by solid state-gel method have high electrical conductivity and have the potential of being applied to the cathode of the medium temperature SOFC, the thermal expansion coefficient and the sintering temperature are the areas to be improved to meet the needs.

Therefore, a possible solution for developing the cathode material of the medium/low temperature high performance SOFC may be using doping element with similar atomic radius for replacing Ni and Co in order to increase the generation of the oxygen vacancies and to reduce the thermal expansion coefficient, by using solid synthesis to manufacture, and by executing microstructure and electrical analysis after selecting the optimal parameters for developing new cathode material with better features and lower cost.

SUMMARY

The present disclosure provides a ceramic cathode material of a solid oxide fuel cell and a manufacturing method thereof. The method includes mixing a lanthanum-containing compound, a cobalt-containing compound, a nickel-containing compound, and a copper-containing compound, for manufacturing the medium to low temperature type ceramic cathode material, which has the features of high electrical conductivity and lowering the thermal expansion coefficient under medium/low temperature environment.

The chemical formula of the ceramic cathode material of the solid oxide fuel cell which may achieve the aforementioned objectives is $LaCo_zNi_yCu_xO_{3-\delta}$, wherein $x+y+z=1$ and $\delta$ is the oxygen vacancy value.

Specifically, x ranges from 0.01 to 0.3, y ranges from 0 to 0.89, and z ranges from 0.1 to 0.99.

Specifically, the ceramic cathode material of the solid oxide fuel cell is manufactured by mixing the lanthanum-containing compound, the cobalt-containing compound, the nickel-containing compound, and the copper-containing compound, and by using solid synthesis method or gel synthesis method.

Specifically, the lanthanum-containing compound is a lanthanum-containing oxide, a lanthanum-containing chloride, a lanthanum-containing nitrate, a lanthanum-containing acetate, a lanthanum-containing oxalate, or a lanthanum-containing organic metal salt.

Specifically, the cobalt-containing compound is a cobalt-containing oxide, a cobalt-containing chloride, a cobalt-containing nitrate, a cobalt-containing acetate, a cobalt-containing oxalate, or a cobalt-containing organic metal salt.

Specifically, the nickel-containing compound is a nickel-containing oxide, a nickel-containing chloride, a nickel-containing nitrate, a nickel-containing acetate, a nickel-containing oxalate, or a nickel-containing organic metal salt.

Specifically, the copper-containing compound is a copper-containing oxide, a copper-containing chloride, a copper-containing nitrate, a copper-containing acetate, a copper-containing oxalate, or a copper-containing organic metal salt.

The manufacturing method of the ceramic cathode material of the solid oxide fuel cell includes the following steps:

(1) preheating the lanthanum-containing compound for removing moisture thereof, adding the cobalt-containing compound, and doping the nickel-containing compound and the copper-containing compound, before performing a first ball mill mixing, a slurry outputting, and a drying process;

(2) calcining a powder for manufacturing a powder body, and performing a second ball mill mixing, slurry outputting, and drying process, before tablet-pressing the dried powder body for making a flake;

(3) degreasing and sintering the flake for preparing a sintered and compact cathode bulk, and measuring and analyzing the cathode bulk serving as the ceramic cathode material.

Specifically, the lanthanum-containing compound is a lanthanum-containing oxide.

Specifically, the cobalt-containing compound is a cobalt-containing oxide.

Specifically, the nickel-containing compound is a nickel-containing oxide.

Specifically, the copper-containing compound is a copper-containing oxide.

Specifically, the quantity of cobalt doped in the cathode bulk material ranges from 10 to 99 atom %.

Specifically, the quantity of nickel doped in the cathode bulk material ranges from 0 to 89 atom %.

Specifically, the quantity of copper doped in the cathode bulk material ranges from 1 to 30 atom %.

Specifically, the doping mol percentage of the copper-containing compound ranges from 5 to 30%.

Another manufacturing method of a ceramic cathode material of a solid oxide fuel cell according to the present disclosure includes the following steps:

(1) dissolving a predetermined quantity of a lanthanum-containing compound, a cobalt-containing compound, a nickel-containing compound, and a copper-containing compound in a solvent, for preparing a solution associated with a fixed metal ion ratio;

(2) adding a precipitant for precipitating a precipitate which includes ions in the solution, and performing a filtering, a cleaning, and a drying process; and performing a thermal treatment for preparing a ceramic cathode material powder.

Specifically, the lanthanum-containing compound is a lanthanum-containing chloride, a lanthanum-containing nitrate, a lanthanum-containing acetate, a lanthanum-containing oxalate, or a lanthanum-containing organic metal salt.

Specifically, the cobalt-containing compound is a cobalt-containing chloride, a cobalt-containing nitrate, a cobalt-containing acetate, a cobalt-containing oxalate, or a cobalt-containing organic metal salt.

Specifically, the nickel-containing compound is a nickel-containing chloride, a nickel-containing nitrate, a nickel-containing acetate, a nickel-containing oxalate, or a nickel-containing organic metal salt.

Specifically, the copper-containing compound is a copper-containing chloride, a copper-containing nitrate, a copper-containing acetate, a copper-containing oxalate, or a copper-containing organic metal salt.

Specifically, the quantity of cobalt doped in the ceramic cathode material powder ranges from 10 to 99 atom %.

Specifically, the quantity of nickel doped in the ceramic cathode material powder ranges from 0 to 89 atom %.

Specifically, the quantity of copper doped in the ceramic cathode material powder ranges from 1 to 30 atom %.

Specifically, the doping mol percentage of the copper-containing compound ranges from 5 to 30%.

BRIEF DESCRIPTION OF THE DRAWINGS

The drawings included herein provide further understanding of the present disclosure. A brief introduction of the drawings is as follows.

DESCRIPTION OF THE EXEMPLARY EMBODIMENTS

For further understanding of the present disclosure, reference is made to the following detailed description illustrating the embodiments and examples of the present disclosure. The description is only for illustrating the present disclosure, not for limiting the scope of the claim.

Figure 1:
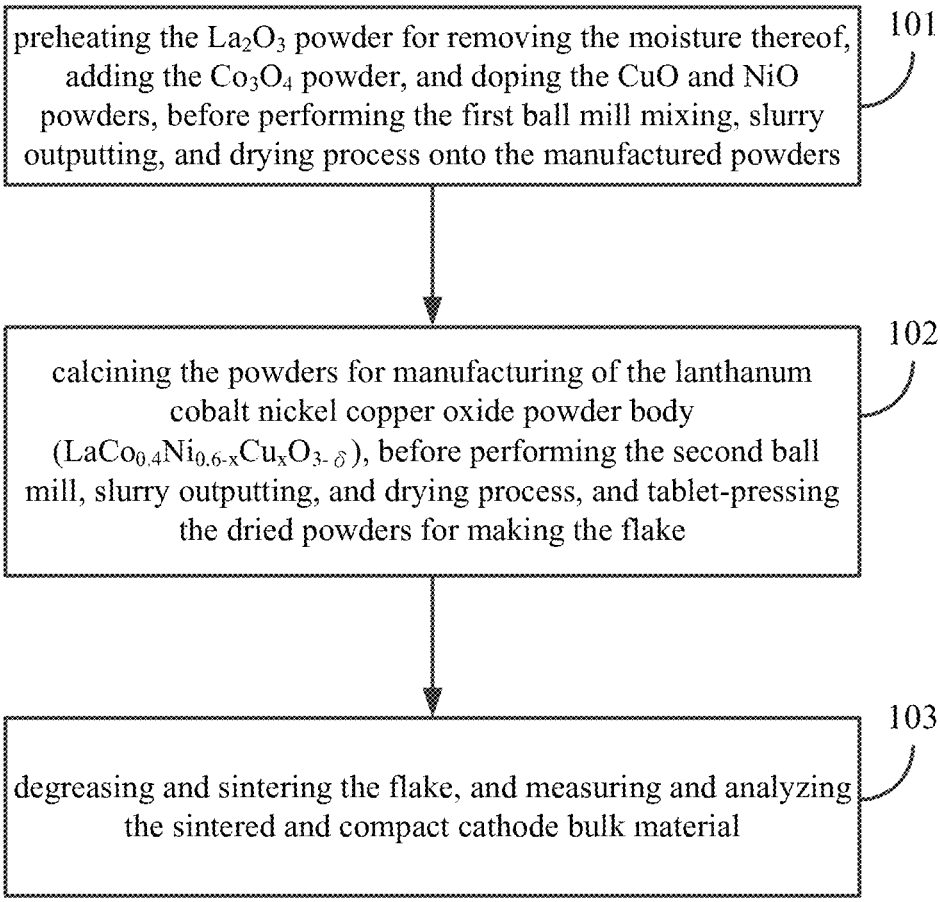
FIG. 1 shows a flow chart of a manufacturing method of a ceramic cathode material of a solid oxide fuel cell according to one embodiment of the present disclosure.

Please refer to FIG. 1 which shows an application flow chart of a manufacturing method of a ceramic cathode material of a solid oxide fuel cell according to one embodiment of the present disclosure. The present disclosure mixes a lanthanum-containing compound, a cobalt-containing compound, a nickel-containing compound, and a copper-containing compound using the solid synthesis method. In this embodiment, the lanthanum-containing compound (oxide) is $La_2O_3$, the cobalt-containing compound (oxide) is $Co_3O_4$, the nickel-containing compound (oxide) is NiO, and the copper-containing compound (oxide) is CuO. As shown in FIG. 1, the method for manufacturing the ceramic cathode material (cathode bulk) applicable in the fuel cell includes the following steps:

1. preheating the $La_2O_3$ powder for removing the moisture, and adding the $Co_3O_4$, before doping the CuO and NiO powders, and performing a first ball mill mixing, slurry outputting, and drying process to the manufactured powder (101);

2. calcining the powder for manufacturing the lanthanum cobalt nickel copper oxide ($LaCo_{0.4}Ni_{0.6-x}Cu_xO_{3-\delta}$) powder body, and performing a second ball mill mixing, slurry outputting, and drying process, before tablet-pressing the dried powder body for making a flake (102); (In this embodiment, the chemical formula of the manufactured powder body is $LaCo_zNi_yCu_xO_{3-\delta}$, wherein $y=y'-x$, $z=1-y'$, $y'=0.6$, and $x+y+z=1$.)

3. sintering and degreasing the flake, and measuring and analyzing the sintered and compact cathode bulk (103).

Figure 2:
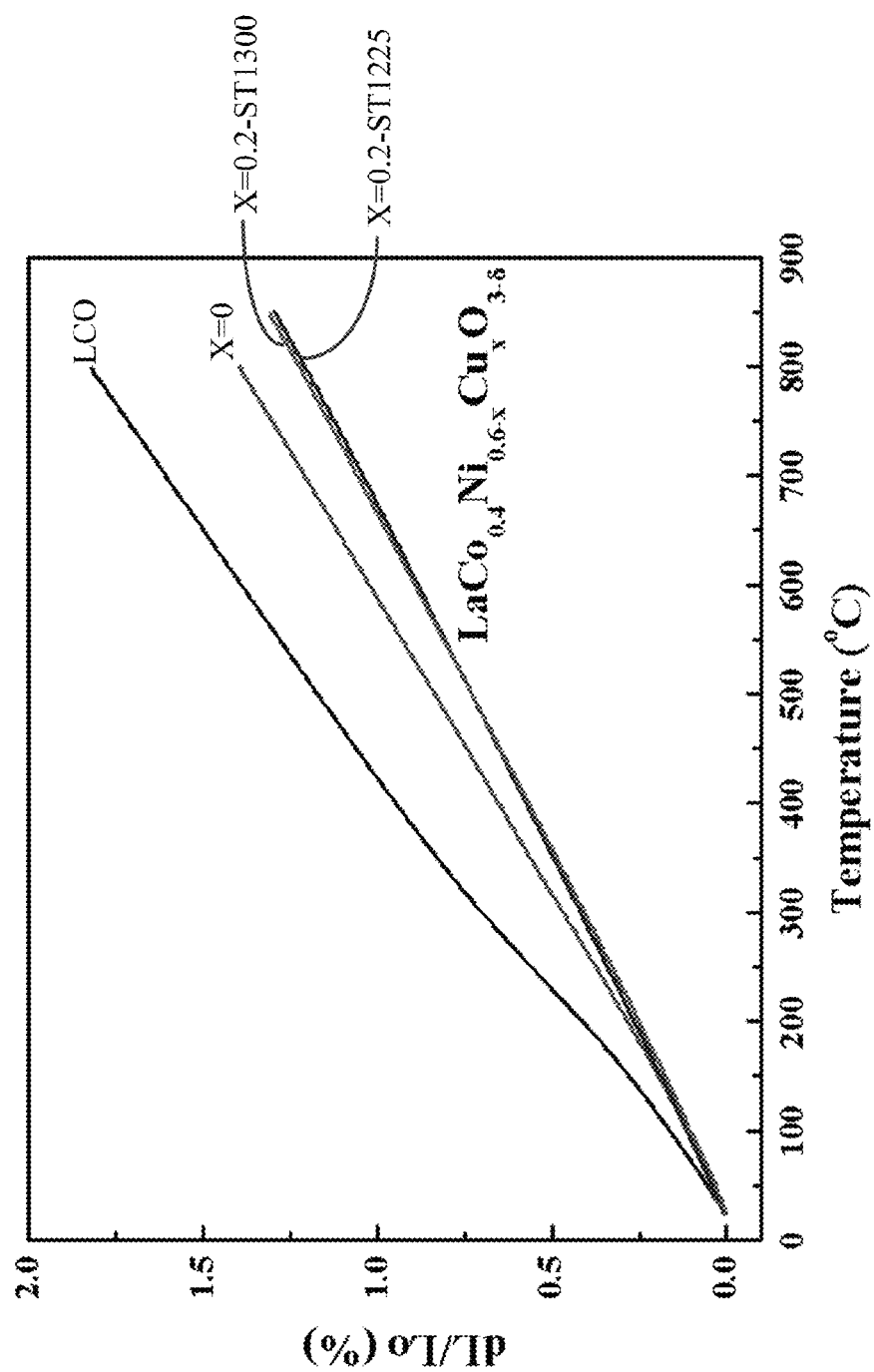
FIG. 2 shows an analysis curve diagram of a thermal expansion coefficient of a ceramic cathode material of a solid oxide fuel cell according to one embodiment of the present disclosure.

As shown in FIG. 2 which shows an analysis diagram of the thermal expansion coefficient of the cathode bulk when the cathode bulk is under the temperature ranging from 0 to 900 degrees Celsius, after the cathode bulk $LaCo_{0.4}Ni_{0.6-x}Cu_xO_{3-\delta}$ is manufactured by doping CuO and NiO into $LaCoO_{3-\delta}$. As shown in FIG. 2, the value of x ranges from 0.01 to 0.2 (x=0.2 means that the doped Cu has 20 atom %, y is the quantity of the doped Ni, and z is the quantity of the doped Co), with the thermal expansion coefficient decreasing while x increases. When the $LaCo_{0.4}Ni_{0.6-x}Cu_xO_{3-\delta}$ with x equaling to 0.2, the thermal expansion coefficient may be reduced most significantly. For comparing with the present disclosure, three experimental analyses are conducted. The first analysis is a cathode bulk $LaCoO_{3-\delta}$ without doping oxides, the second analysis is a cathode bulk $LaCoO_{3-\delta}$ doped with NiO, and the third analysis is a cathode bulk $LaCoO_{3-\delta}$ doped with NiO and CuO. Under the temperature 800 degrees Celsius, the first analysis measures that the thermal expansion coefficient (CTE) is 23.9 ($10^{-6}/°$ C.), the second analysis measures that the thermal expansion coefficient (CTE) is 18.3 ($10^{-6}/°$ C.), and the third analysis measures that the thermal expansion coefficient (CTE) is 15.6 ($10^{-6}/°$ C.). Therefore, the thermal expansion coefficient of the cathode bulk $LaCo_{0.4}Ni_{0.6-x}Cu_xO_{3-\delta}$ manufactured by doping CuO and NiO into $LaCoO_{3-\delta}$ is the smallest among the three. According to the experiments, although the cathode bulk manufactured by only doping NiO is able to reduce the thermal expansion coefficient, it is unable to lower the sintering temperature and increase electrical conductivity thereof. Thus, the features of the cathode bulk $LaCo_{0.4}Ni_{0.6-x}Cu_xO_{3-\delta}$ manufactured by doping CuO and NiO according to the present disclosure may be another option to take into account when compared with the cathode bulk manufactured by only having NiO doped.

Figure 3:
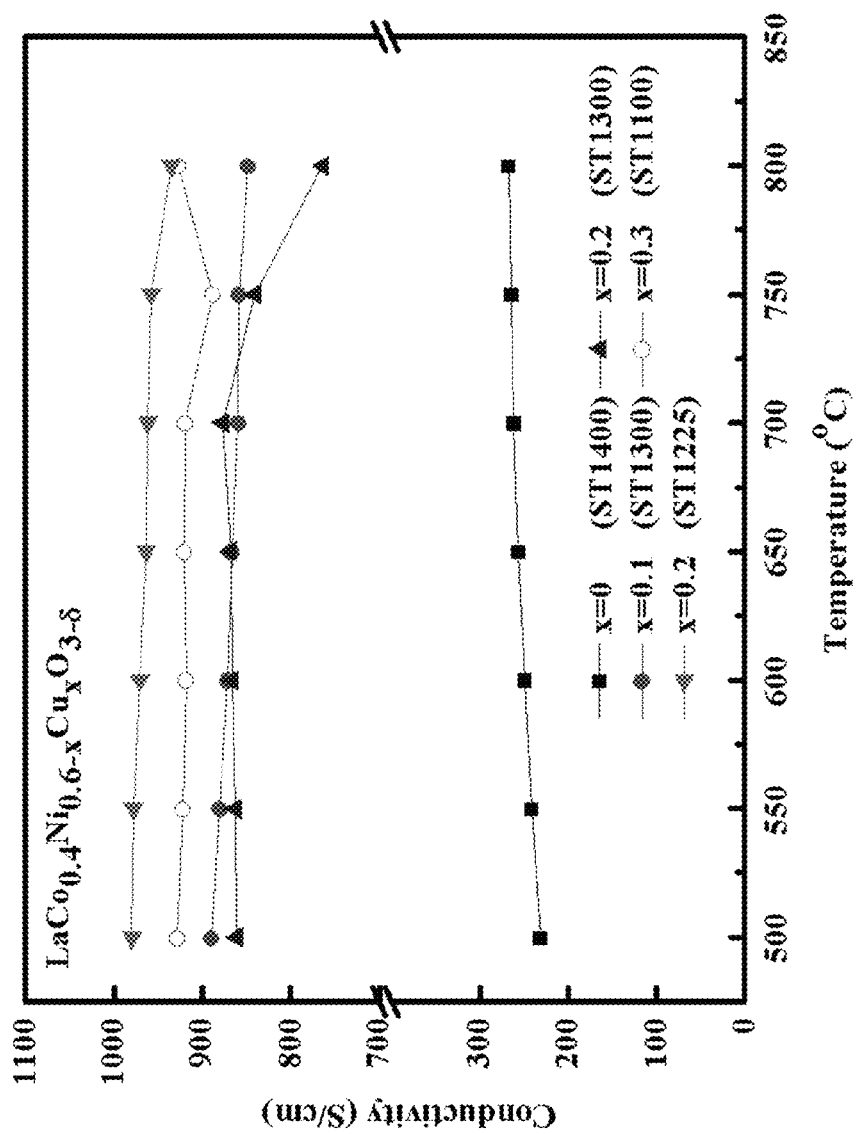
FIG. 3 shows an analysis curve diagram of an electrical conductivity of a ceramic cathode material of a solid oxide fuel cell according to one embodiment of the present disclosure.
Figure 4:
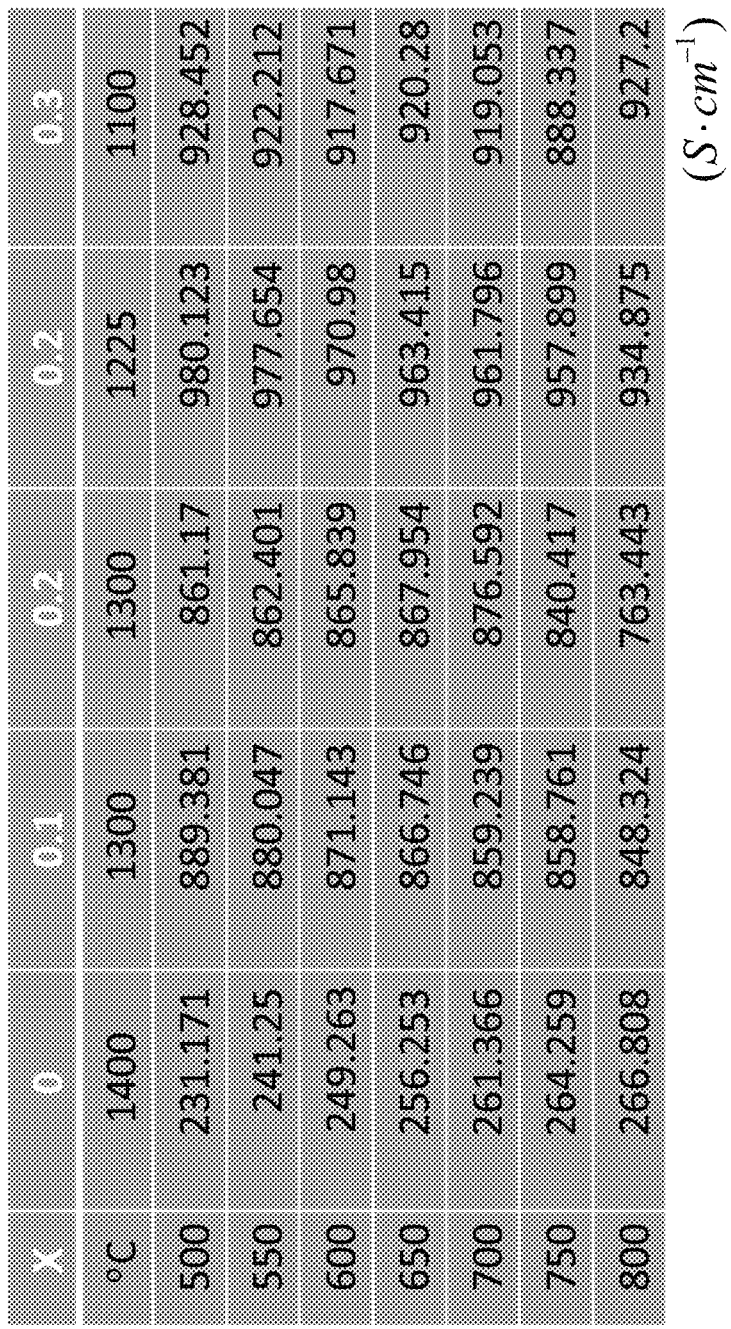
FIG. 4 shows an analysis diagram of an electrical conductivity data of a ceramic cathode material of a solid oxide fuel cell according to one embodiment of the present disclosure.

FIG. 3 and FIG. 4 are respectively an analysis curve diagram of the electrical conductivity and a data analysis diagram of the electrical conductivity with different values of x. The cathode bulks $LaCo_{0.4}Ni_{0.6-x}Cu_xO_{3-\delta}$ with sintering temperatures (1100, 1225, 1300, and 1400 degrees Celsius) are electrically measured under the temperature ranges from 500 to 800 degrees Celsius. As shown in the figures, the cathode bulk with NiO and CuO doping according to the present disclosure is able to increase the electrical conductivity. Although the electrical conductivity when x=0.3 is lower than the electrical conductivity when x=0.2, such electrical conductivity is still higher than the electrical conductivity (100 $S \cdot cm^{-1}$) of the conventional ceramic cathode material.

As shown from FIGS. 2 to 4 that after the CuO and NiO are doped into $LaCoO_{3-\delta}$, the increasing doping of Cu decreases the sintering temperature and increases the electrical conductivity. Such decrease and increase may be optimized when the doping of Cu equals to 0.2 atom % (x=0.2). Beside x=0.2, the value of x ranges from 0.01 to 0.3 (which includes 0.01, 0.0125, 0.025, 0.0375, 0.05, 0.0625, 0.075, 0.0875, 0.1, 0.1125, 0.125, 0.1375, 0.15, 0.1625, 0.175, 0.1875, 0.2, 0.2125, 0.225, 0.2375, 0.25, 0.2625, 0.275, 0.2875, and 0.3), and therefore the doping of Cu in the cathode bulk ranges from 1 to 30 atom %.

Because $x+y+z=1$, x ranges from 0.01 to 0.3, y ranges from 0 to 0.89, and z ranges from 0.1 to 0.99. In addition, the doping of cobalt in the cathode bulk ranges from 10 to 99 atom %, the doping of nickel in the cathode bulk ranges from 0 to 89 atom %, and the doping of copper in the cathode bulk ranges from 1 to 30 atom %.

Figure 5:
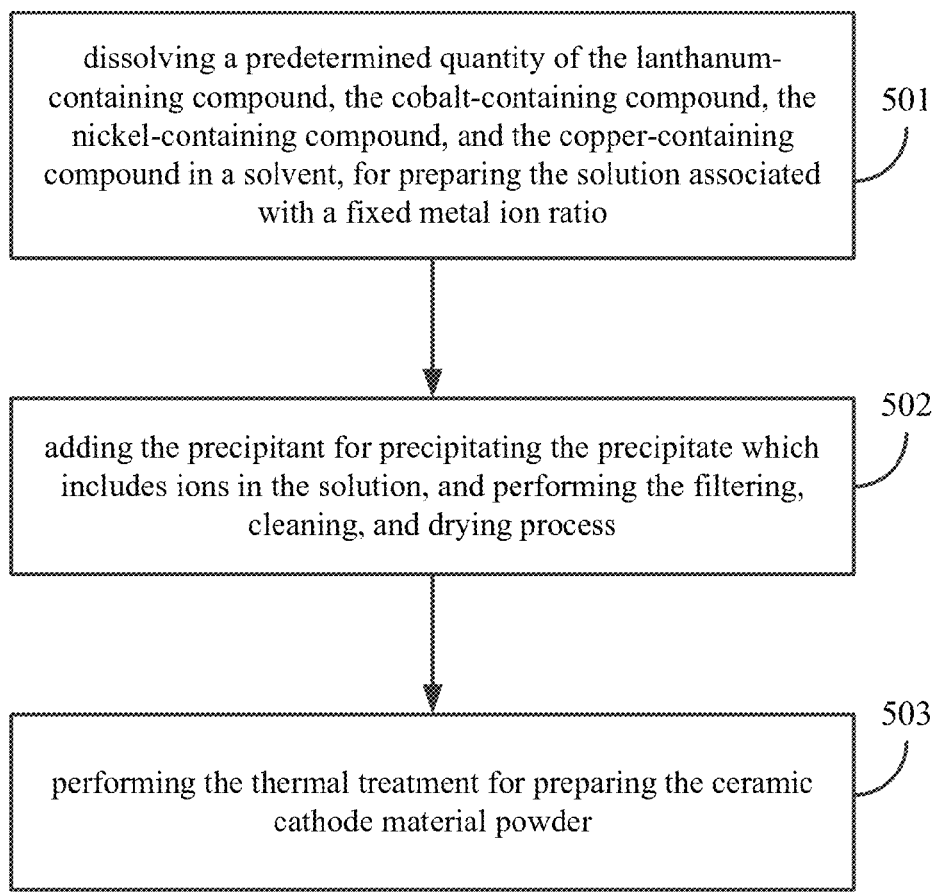
FIG. 5 shows a flow chart of a manufacturing method of a ceramic cathode material of a solid oxide fuel cell according to another embodiment of the present disclosure.

In addition to the oxides used in the aforementioned embodiment, the lanthanum-containing compound, the cobalt-containing compound, the nickel-containing compound, and the copper-containing compound chloride, nitrate, acetate, oxalate, or organic metal salt can also be used for manufacturing the ceramic cathode material with the chemical formula $LaCo_zNi_yCu_xO_{3-\delta}$. The chloride, the nitrate, the acetate, the oxalate, or the organic metal salt may be manufactured using the gel synthesis as shown in FIG. 5. And such method includes:

1. dissolving a predetermined quantity of the lanthanum-containing compound, the cobalt-containing compound, the nickel-containing compound, and the copper-containing compound in a solvent, for preparing a solution associated with a fixed metal ion ratio (501);

2. adding a precipitant for precipitating a precipitate which includes ions in the solution, and performing a filtering, a cleaning, and a drying process (502); and 3. performing a thermal treatment for preparing a ceramic cathode material powder (503).

The ceramic cathode material of the solid oxide fuel cell and the manufacturing method thereof provided by the present disclosure have the following advantages over the conventional techniques:

1. The present disclosure manufactures the $LaCo_zNi_yCu_xO_{3-\delta}$ cathode bulk by mixing the lanthanum-containing compound, the cobalt-containing compound, the nickel-containing compound, and the copper containing compound using solid synthesis method or gel synthesis method. The manufactured cathode bulk has the features of high electrical conductivity and the reduced thermal expansion coefficient under the medium/low environment (500 to 800 degrees Celsius).

2. The ceramic cathode material $LaCo_zNi_yCu_xO_{3-\delta}$ in the present disclosure may lower the sintering temperature and the thermal expansion coefficient, while increasing the relative density and the electrical conductivity by increasing the doping of Cu.

Some modifications of these examples, as well as other possibilities will, on reading or having read this description, or having comprehended these examples, will occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims.

What is claimed is:

1. A ceramic cathode material of a solid oxide fuel cell, wherein a chemical formula of the ceramic cathode material is $LaCo_{0.4}Ni_{0.6-x}Cu_xO_{3-\delta}$, x=0.01–0.3, and $\delta$ is an oxygen vacancy value.

2. The ceramic cathode material of the solid oxide fuel cell according to claim 1, wherein the ceramic cathode material is a mixture of a lanthanum-containing compound, a cobalt-containing compound, a nickel-containing compound, and a copper-containing compound, and is made by solid synthesis method or gel synthesis method.

3. The ceramic cathode material of the solid oxide fuel cell according to claim 2, wherein the lanthanum-containing compound is a lanthanum-containing oxide, a lanthanum-containing chloride, a lanthanum-containing nitrate, a lanthanum-containing acetate, a lanthanum-containing oxalate, or a lanthanum-containing organic metal salt.

4. The ceramic cathode material of the solid oxide fuel cell according to claim 2, wherein the cobalt-containing compound is a cobalt-containing oxide, a cobalt-containing chloride, a cobalt-containing nitrate, a cobalt-containing acetate, a cobalt-containing oxalate, or a cobalt-containing organic metal salt.

5. The ceramic cathode material of the solid oxide fuel cell according to claim 2, wherein the nickel-containing compound is a nickel-containing oxide, a nickel-containing chloride, a nickel-containing nitrate, a nickel-containing acetate, a nickel-containing oxalate, or a nickel-containing organic metal salt.

6. The ceramic cathode material of the solid oxide fuel cell according to claim 2, wherein the copper-containing compound is a copper-containing oxide, a copper-containing chloride, a copper-containing nitrate, a copper-containing acetate, a copper-containing oxalate, or a copper-containing organic metal salt.

* * * * *